US012764139B2

(12) United States Patent
Freeman et al.

(10) Patent No.: US 12,764,139 B2
(45) Date of Patent: Oct. 13, 2026

(54) SYSTEMS, METHODS, AND APPARATUSES FOR DETERMINING PROBABILITY OF MISAPPROPRIATION OF A RESOURCE BASED ON GEOLOCATION TRACKING OVER AN ELECTRONIC NETWORK

(71) Applicant: BANK OF AMERICA CORPORATION, Charlotte, NC (US)

(72) Inventors: Ion Chalmers Freeman, Brooklyn, NY (US); Manu Jacob Kurian, Dallas, TX (US); Ganesh Bonda, Charlotte, NC (US); Kumara Swamy Kariyappa Reddy, Charlotte, NC (US); Arvind Chhabra, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 315 days.

(21) Appl. No.: 18/094,093

(22) Filed: Jan. 6, 2023

(65) Prior Publication Data

US 2024/0236126 A1 Jul. 11, 2024

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC ........................ H04L 63/1425; H04L 63/1441
See application file for complete search history.

(56) References Cited

U.S. PATENT DOCUMENTS

| | | | |
|---|---|---|---|
| 6,651,168 | B1 | 11/2003 | Kao |
| 7,058,806 | B2 | 6/2006 | Smeets |
| 7,698,443 | B2 | 4/2010 | Yaffe |
| 7,783,281 | B1 | 8/2010 | Cook |
| 8,295,898 | B2 | 10/2012 | Ashfield |
| 9,971,885 | B2 | 5/2018 | Grigg |
| 2002/0157029 | A1 | 10/2002 | French |
| 2002/0186845 | A1 | 12/2002 | Dutta |
| 2003/0065805 | A1 | 4/2003 | Barnes |
| 2003/0163708 | A1 | 8/2003 | Tang |
| 2005/0119978 | A1 | 6/2005 | Ates |
| 2007/0100773 | A1 | 5/2007 | Wallach |
| 2007/0194884 | A1 | 8/2007 | Didier |
| 2007/0250920 | A1 | 10/2007 | Lindsay |
| 2008/0319889 | A1 | 12/2008 | Hammad |
| 2009/0019534 | A1 | 1/2009 | Bakshi |

(Continued)

*Primary Examiner* — Thomas J Dailey
(74) *Attorney, Agent, or Firm* — Moore & Van Allen PLLC; William Walters

(57) ABSTRACT

Systems, computer program products, and methods are described herein for determining probability of misappropriation of a resource based on geolocation tracking over an electronic network. The method includes receiving a resource processing request. The resource processing request includes a request geolocation and is associated with a user. The method also includes receiving a device geolocation of a user device associated with the user. The method further includes comparing the request geolocation and the device geolocation. Based on the comparison of the request geolocation and the device geolocation, the method still further includes causing an execution of the resource processing request in an instance in which the request geolocation and the device geolocation match.

20 Claims, 7 Drawing Sheets

(56) References Cited

U.S. PATENT DOCUMENTS

| | | | | |
|---|---|---|---|---|
| 2009/0187492 | A1 | 7/2009 | Hammad | |
| 2010/0048167 | A1 | 2/2010 | Chow | |
| 2011/0004921 | A1 | 1/2011 | Homer | |
| 2012/0209773 | A1 * | 8/2012 | Ranganathan | G06Q 20/40 705/44 |
| 2016/0140562 | A1 * | 5/2016 | Birukov | G06Q 20/3224 705/39 |

* cited by examiner

SYSTEMS, METHODS, AND APPARATUSES FOR DETERMINING PROBABILITY OF MISAPPROPRIATION OF A RESOURCE BASED ON GEOLOCATION TRACKING OVER AN ELECTRONIC NETWORK

TECHNOLOGICAL FIELD

Example embodiments of the present disclosure relate to determining probability of misappropriation of a resource and, more particularly, to determining probability of misappropriation of a resource based on geolocation tracking over an electronic network.

BACKGROUND

Misappropriation of a user's account can be difficult to monitor and prevent in real-time. Applicant has identified a number of deficiencies and problems associated with preventing and reducing misappropriation of user accounts. Through applied effort, ingenuity, and innovation, many of these identified problems have been solved by developing solutions that are included in embodiments of the present disclosure, many examples of which are described in detail herein

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for determining probability of misappropriation of a resource based on geolocation tracking over an electronic network.

In one aspect, a system for determining probability of misappropriation of a resource based on geolocation tracking over an electronic network is provided. The system includes at least one non-transitory storage device and at least one processing device coupled to the at least one non-transitory storage device. The at least one processing device is configured to receive a resource processing request. The resource processing request includes a request geolocation. The resource processing request is associated with a user. The at least one processing device is also configured to receive a device geolocation of a user device associated with the user. The at least one processing device is further configured to compare the request geolocation and the device geolocation. The at least one processing device is still further configured to cause an execution of the resource processing request in an instance in which the request geolocation and the device geolocation match based on the comparison of the request geolocation and the device geolocation.

In some embodiments, the at least one processing device is further configured to, based on the comparison of the request geolocation and the device geolocation, cause a transmission of an escalation action in an instance in which the request geolocation and the device geolocation are different and the escalation action includes at least one of a rejection of the resource processing request or a request for at least one additional security measure.

In some embodiments, the request for at least one additional security measure includes causing a transmission of the request to the user device associated with the user to provide additional information relating to the resource processing request.

In some embodiments, in an instance in which the request geolocation and the device geolocation are matching, the at least one processing device is configured to cause a circumvention of at least one additional security measure associated with the resource processing request.

In some embodiments, the at least one processing device is further configured to receive a predetermined geolocation range; compare the request geolocation with the predetermined geolocation range; and cause a transmission of an escalation action based on the comparison of the request geolocation being outside of the predetermined geolocation range, and the request geolocation and the device geolocation being different. In such an embodiment, the escalation action includes at least one of a rejection of the resource processing request or a request for at least one additional security measure.

In some embodiments, the at least one processing device is further configured to receive a predetermined device geolocation range; overlay the predetermined device geolocation range on the device geolocation; compare the request geolocation with the predetermined device geolocation range; and based on the comparison of the request geolocation being outside of the predetermined device geolocation range, cause a transmission of an escalation action. In such an embodiment, the escalation action includes at least one of a rejection of the resource processing request or a request for at least one additional security measure.

In some embodiments, the at least one processing device is further configured to receive a circumvent indicator with the circumvent indicator including one or more resource details in which an escalation action is circumvented. In such an embodiment, the escalation action includes at least one of a rejection of the resource processing request or a request for at least one additional security measure. In such an embodiment, the at least one processing device is further configured to compare one or more request details of the resource processing request with the one or more resource details of the circumvent indicator and cause a circumvention of the escalation action in an instance in which at least one of the resource details of the circumvent indicator corresponds to at least one of the request details of the resource processing request.

In another aspect, a computer program product for determining probability of misappropriation of a resource based on geolocation tracking over an electronic network is provided. The computer program product includes at least one non-transitory computer-readable medium having computer-readable program code portions embodied therein. The computer-readable program code portions include an executable portion configured to receive a resource processing request. The resource processing request includes a request geolocation and the resource processing request is associated with a user. The computer-readable program code portions also include an executable portion configured to receive a device geolocation of a user device associated with the user. The computer-readable program code portions further include an executable portion configured to compare the request geolocation and the device geolocation. The computer-readable program code portions still further include an executable portion configured to cause an execution of the resource processing request based on the comparison of the request geolocation and the device geolocation in an instance in which the request geolocation and the device geolocation match.

In some embodiments, the computer program product also includes an executable portion configured to, based on the comparison of the request geolocation and the device geolocation, cause a transmission of an escalation action in an instance in which the request geolocation and the device geolocation are different. In such an embodiment, the escalation action includes at least one of a rejection of the resource processing request or a request for at least one additional security measure.

In some embodiments, the request for at least one additional security measure includes causing a transmission of the request to the user device associated with the user to provide additional information relating to the resource processing request.

In some embodiments, the computer program product also includes an executable portion configured to cause a circumvention of at least one additional security measure associated with the resource processing request in an instance in which the request geolocation and the device geolocation are matching.

In some embodiments, the computer program product further includes an executable portion configured to receive a predetermined geolocation range; compare the request geolocation with the predetermined geolocation range; and cause a transmission of an escalation action based on the comparison of the request geolocation being outside of the predetermined geolocation range, and the request geolocation and the device geolocation being different. In such an embodiment, the escalation action includes at least one of a rejection of the resource processing request or a request for at least one additional security measure.

In some embodiments, the computer program product also includes an executable portion configured to receive a predetermined device geolocation range; overlay the predetermined device geolocation range on the device geolocation; compare the request geolocation with the predetermined device geolocation range; and cause a transmission of an escalation action based on the comparison of the request geolocation being outside of the predetermined device geolocation range. In such an embodiment, the escalation action includes at least one of a rejection of the resource processing request or a request for at least one additional security measure.

In some embodiments, the computer program product also includes an executable portion configured to receive a circumvent indicator. The circumvent indicator includes one or more resource details in which an escalation action is circumvented, and the escalation action includes at least one of a rejection of the resource processing request or a request for at least one additional security measure. In such an embodiment, the computer program product also includes compare one or more request details of the resource processing request with the one or more resource details of the circumvent indicator and cause a circumvention of the escalation action in an instance in which at least one of the resource details of the circumvent indicator corresponds to at least one of the request details of the resource processing request.

In yet another aspect, a computer-implemented method for determining probability of misappropriation of a resource based on geolocation tracking over an electronic network is provided. The computer-implemented method includes receiving a resource processing request. The resource processing request includes a request geolocation, and the resource processing request is associated with a user. The computer-implemented method also includes receiving a device geolocation of a user device associated with the user. The computer-implemented method further includes comparing the request geolocation and the device geolocation. The computer-implemented method still further includes causing an execution of the resource processing request in an instance in which the request geolocation and the device geolocation match based on the comparison of the request geolocation and the device geolocation.

In some embodiments, the method includes causing a transmission of an escalation action based on the comparison of the request geolocation and the device geolocation in an instance in which the request geolocation and the device geolocation are different. The escalation action includes at least one of a rejection of the resource processing request or a request for at least one additional security measure.

In some embodiments, the request for at least one additional security measure includes causing a transmission of the request to the user device associated with the user to provide additional information relating to the resource processing request.

In some embodiments, the method also includes causing a circumvention of at least one additional security measure associated with the resource processing request in an instance in which the request geolocation and the device geolocation are matching.

In some embodiments, the method also includes receiving a predetermined geolocation range; comparing the request geolocation with the predetermined geolocation range; and causing a transmission of an escalation action based on the comparison of the request geolocation being outside of the predetermined geolocation range, and the request geolocation and the device geolocation being different. The escalation action includes at least one of a rejection of the resource processing request or a request for at least one additional security measure.

In some embodiments, the method also includes receiving a predetermined device geolocation range; overlaying the predetermined device geolocation range on the device geolocation; comparing the request geolocation with the predetermined device geolocation range; and causing a transmission of an escalation action. In such an embodiment, the escalation action includes at least one of a rejection of the resource processing request or a request for at least one additional security measure.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
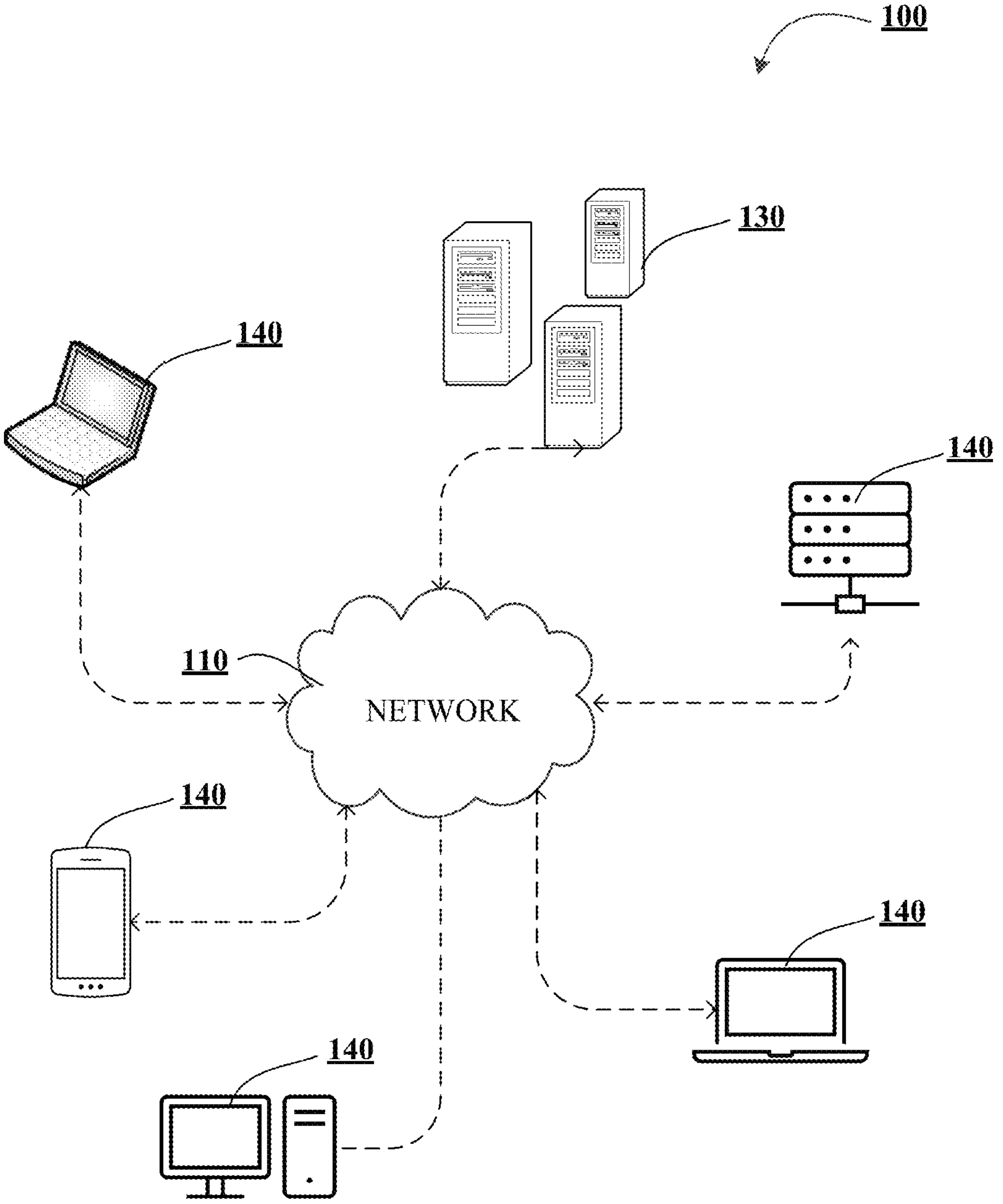
Figure 1B:
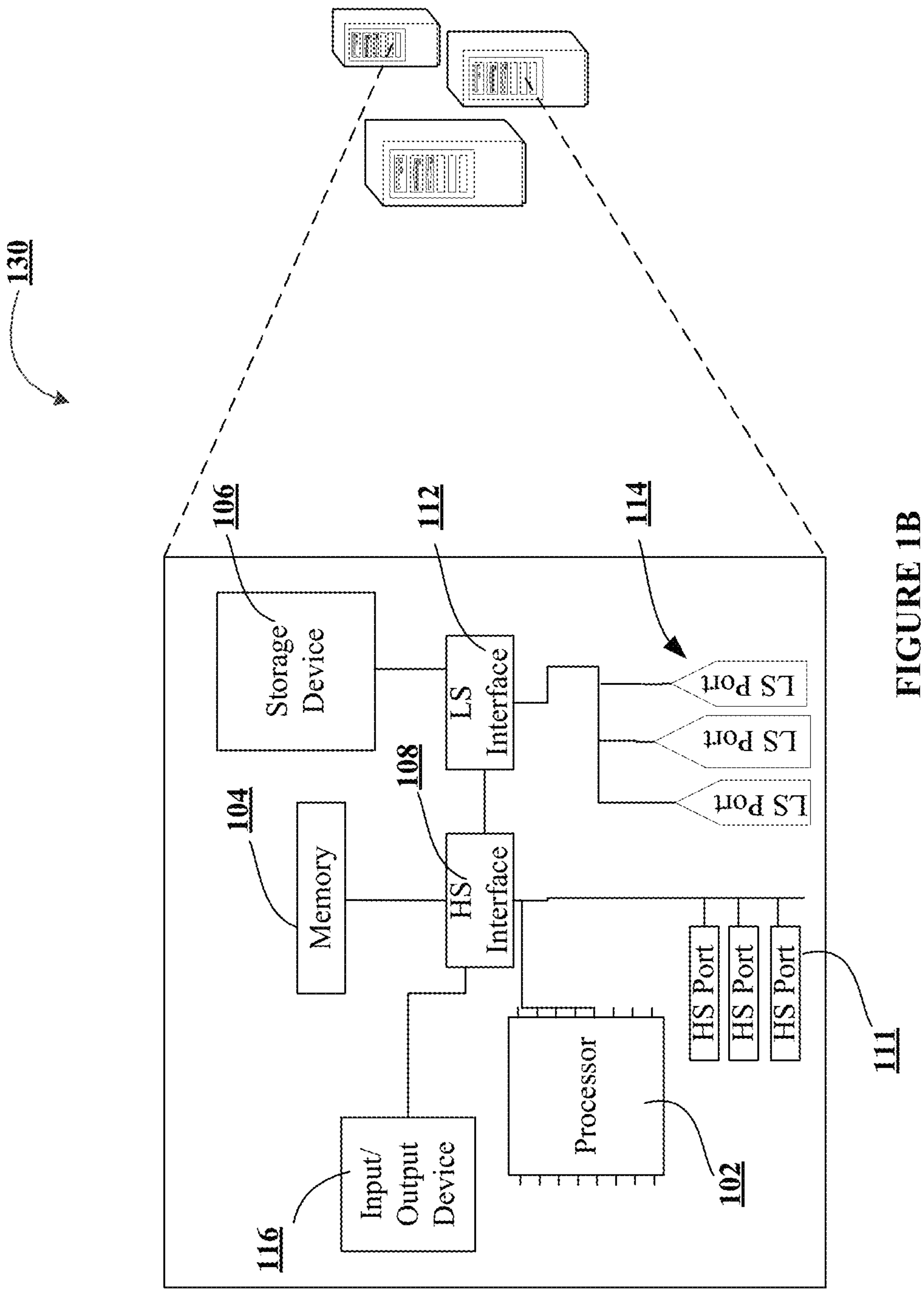
Figure 1C:
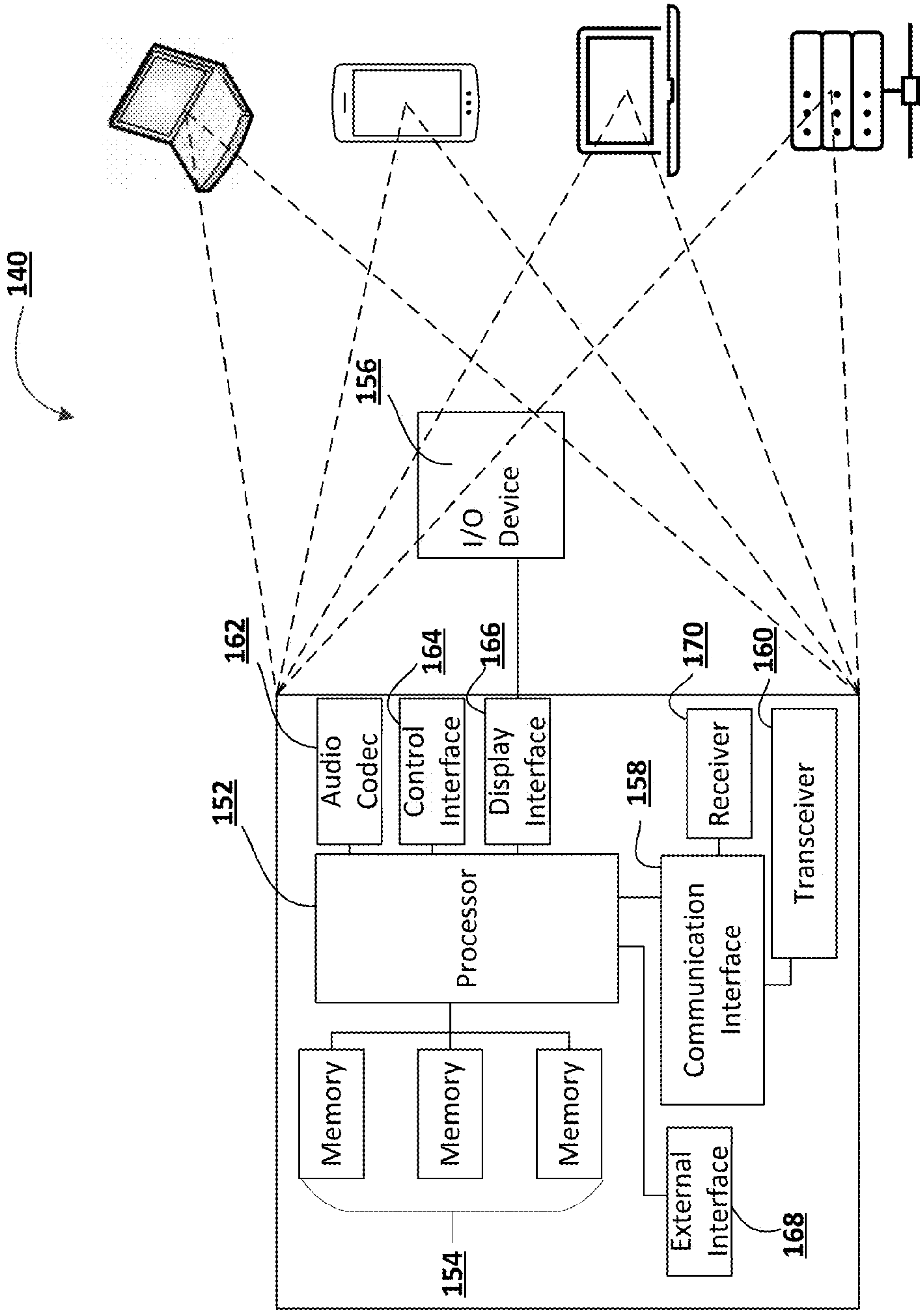
Figure 2:
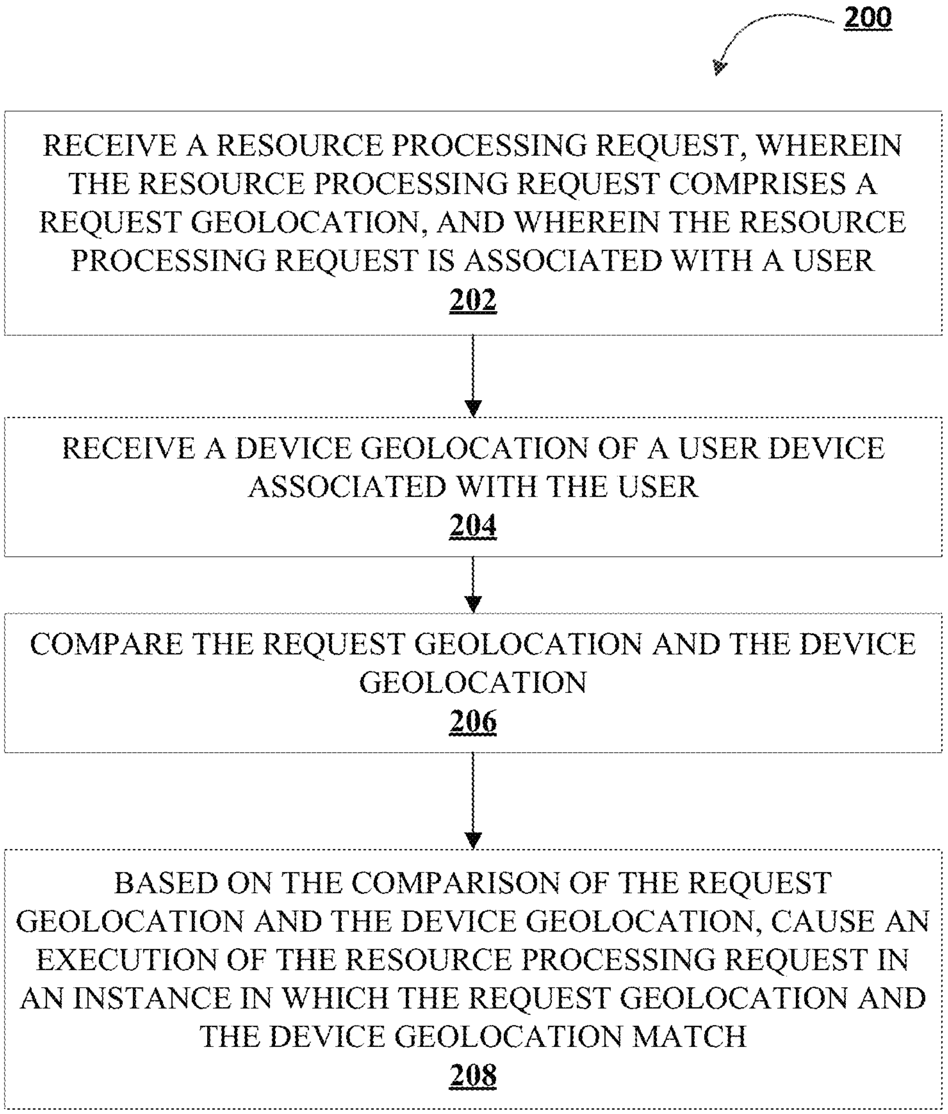
Figure 3:
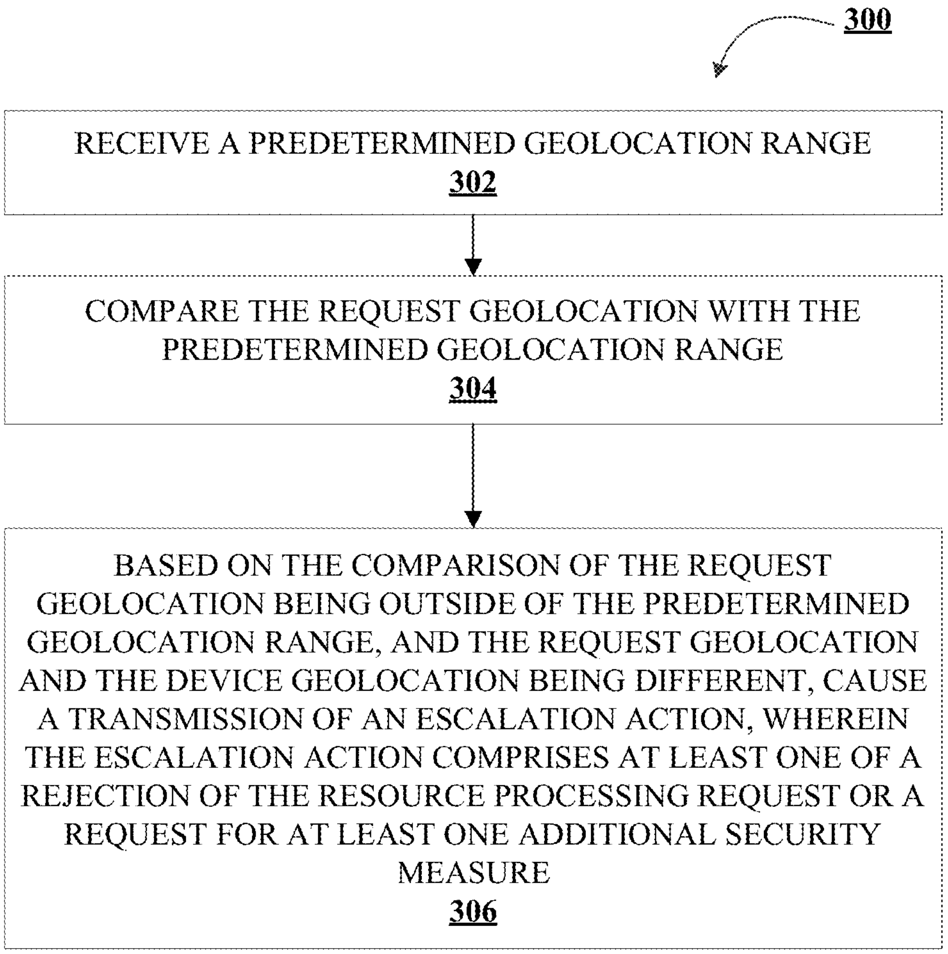
Figure 4:
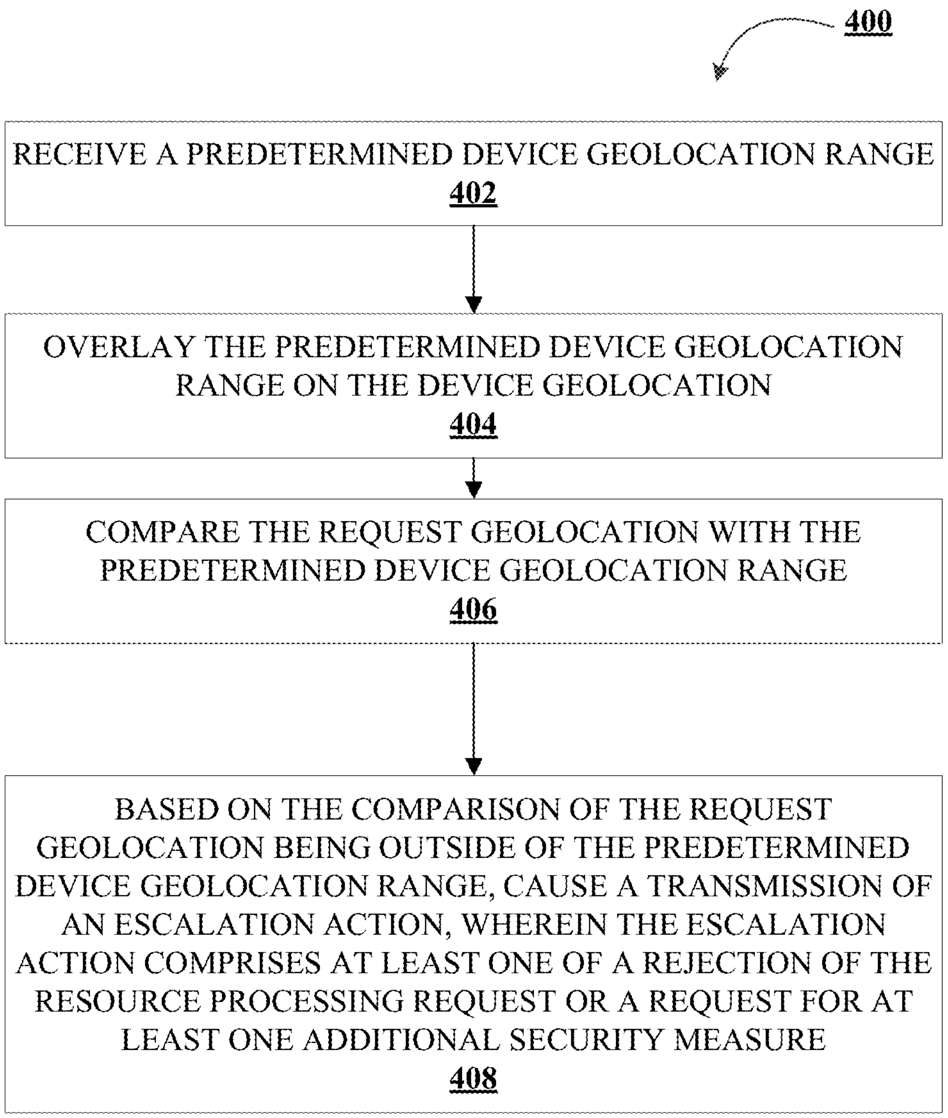
Figure 5:
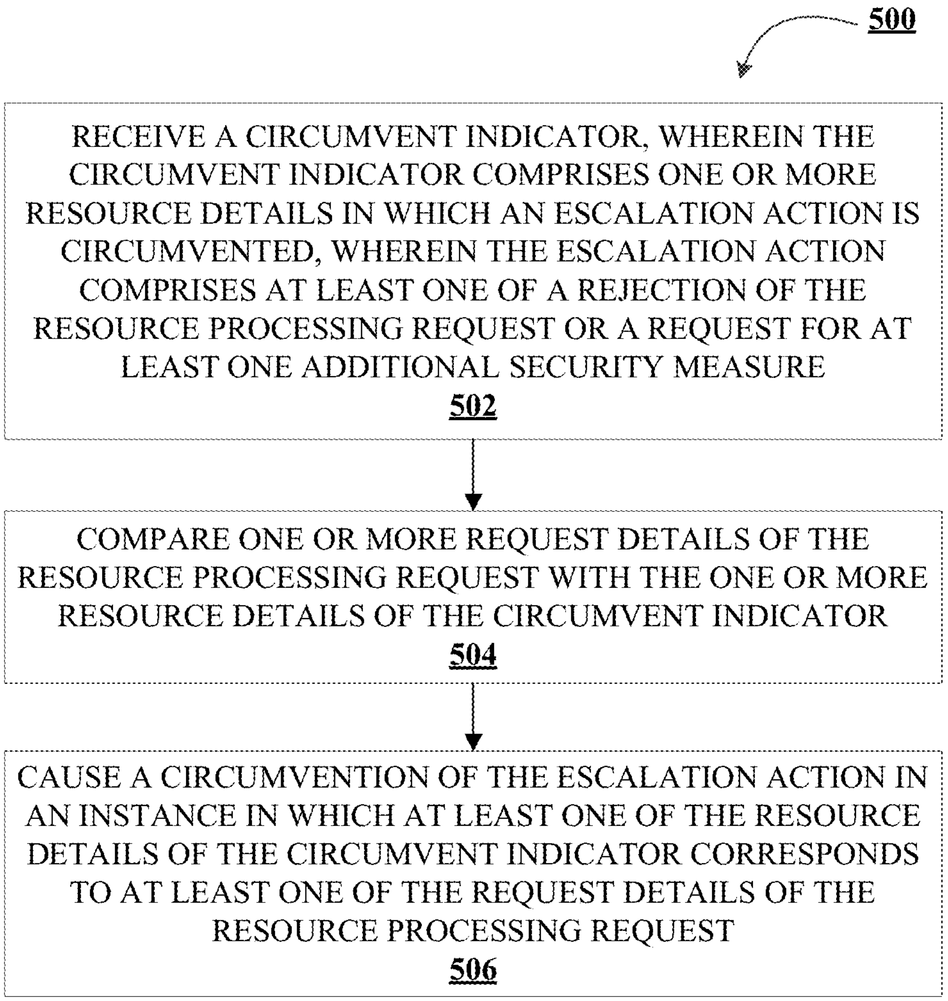

FIGS. 1A-1C illustrates technical components of an exemplary distributed computing environment for determining probability of misappropriation of a resource based on geolocation tracking over an electronic network, in accordance with example embodiments of the present disclosure;

FIG. 2 illustrates a process flow for determining probability of misappropriation of a resource based on geolocation tracking over an electronic network, in accordance with example embodiments of the present disclosure;

FIG. 3 illustrates a process flow for causing a transmission of an escalation action based on the comparison of the request geolocation and the predetermined geolocation range, in accordance with example embodiments of the present disclosure;

FIG. 4 illustrates a process flow for causing a transmission of an escalation action based on the comparison of the predetermined device geolocation range and the request geolocation, in accordance with example embodiments of the present disclosure; and FIG. 5 illustrates a process flow for causing a circumvention of the escalation action, in accordance with example embodiments of the present disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system. In some embodiments, a system may request a user to reauthenticate the user's identity. In some embodiments, the reauthentication request may include requesting the user to enter the user's authentication information.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As described in further detail herein, the present disclosure provides a solution to the above-referenced problems in the field of technology by generating a secure, accurate, and efficient process for determining probability of misappropriation of a resource based on geolocation tracking over an electronic network. The present disclosure solves this technical problem by implementing a system for determining resource misappropriation, like that shown as a geolocation tracking system 130 in FIGS. 1A-1C. For instance, the geolocation tracking system acts to determine probability of misappropriation of a resource based on geolocation tracking—in real-time—by receiving resource processing requests. Further, the geolocation tracking system acts to dynamically determine whether circumvention of an escalation action is appropriate based on the geolocation of the request and the geolocation of the device. In addition, the geolocation tracking system may receive a predetermined geolocation range and a predetermined device geolocation range which may be used to determine whether there is a probability of a misappropriation with a particular resource processing request. Thus, the geolocation tracking system for determining probability of misappropriation of a resource provides a technical solution to the technical problem in securely, accurately, and efficiently determining resource misappropriation.

Users associated with resource distribution entities (e.g., financial institutions and/or the like) are in greater danger than ever in securely requesting resource processing requests at resource distribution devices. Wrongdoers can easily misappropriate a user's credentials and authentication credentials for the user's account associated with an entity (e.g., financial institution) and take over control of the user's account. A challenge arises in determining whether a resource processing request was by the real user of the account, or by another who has misappropriated the user's authentication credentials. The classification of resource processing requests as misappropriations has a large implication for the user and the user's account. Resource processing requests that are not classified as misappropriations, but should be, can have negative consequences regarding the reliability and relationship between the user and the financial institution where the user maintains the user account. In addition, when a resource distribution is determined to be a misappropriation, the user may not know how to proceed to secure the user's account. Without a system that detects and responds to misappropriations, a user's account becomes comprised. A need, therefore, exists for determining probability of misappropriation of a resource based on geolocation tracking.

Embodiments of the present disclosure provide for determining probability of misappropriation of a resource based on geolocation tracking over an electronic network. In this regard, and by way of non-limiting example, the geolocation system may receive a resource processing request (e.g., payment at a merchant device, withdrawal at ATM, transfer of funds between accounts, and/or the like). The geolocation tracking system may receive the geolocation of the resource processing request (e.g., the geolocation of the merchant device, ATM, and/or the like) and the geolocation of a user device (e.g., a mobile telephone, a smart watch, a personal computer, and/or the like). The geolocation tracking system may compare the request geolocation with the device geolocation. In an instance in which the request geolocation and the device geolocation match, then the geolocation tracking system may cause execution of the resource processing request. In an instance in which the request geolocation and the device geolocation are different, the resource processing request may be rejected and/or additional authentication processes may be executed.

Accordingly, the present disclosure for determining probability of misappropriation of a resource based on geolocation tracking over an electronic network works by receiving a resource processing request including a request geolocation; receiving a device geolocation of a user device. The request geolocation and the device geolocation are compared to one another to determine whether the request geolocation and the device geolocation match. In an instance in which the request geolocation and device geolocation match, the resource processing request is caused to be executed.

The present disclosure provides a technical solution to a technical problem. As described herein, the technical problem includes the accurate and effective determination of probability of misappropriation of a resource based on geolocation tracking over an electronic network. Security of resources across electronic networks is a technical problem that is solved using various embodiments of the present disclosure. The technical solution presented herein allows for dynamic, accurate, and secure determination of the probability of misappropriation (which may include a circumvention of an escalation action). In particular, determining probability of misappropriation of a resource based on geolocation is an improvement over existing solutions to the accurate and effective determination of resource misappropriation based on geolocation, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining probability of misappropriation of a resource based on geolocation tracking over an electronic network, in accordance with an embodiment of the disclosure. As shown in FIG. 1A, the distributed computing environment 100 contemplated herein may include a system 130 (e.g., a geolocation tracking system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low-speed port 114 and storage device 106. Each of the components 102, 104, 106, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for determining probability of misappropriation of a resource based on geolocation tracking over an electronic network, in accordance with an embodiment of the disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. Unless otherwise noted, each of the features of FIGS. 2-5 may be carried out by various components of the distributed computing environment 100.

In some embodiments, a geolocation tracking system (e.g., similar to one or more of the systems described herein with respect to FIGS. 1A-1C) may perform one or more of the steps of process flow 200. For example, a geolocation tracking system (e.g., the system 130 described herein with respect to FIGS. 1A-1C) may perform the steps of process flow 200.

As shown in block 202, the process flow 200 may include receiving a resource processing request. The resource processing request includes a request geolocation. The resource processing request is associated with a user. In some embodiments, the geolocation tracking system 130 may receive the resource processing request from the network (e.g., network 110 of FIGS. 1A-1C). In some embodiments, the geolocation tracking system 130 may receive the resource processing request through a communication device (e.g., a networking device coupled with the low-speed expansion port 114 of FIGS. 1A-1C). In some embodiments, the network (e.g., network 110 of FIGS. 1A-1C) may receive the resource processing request from an end-point device (e.g., end-point device(s) 140 of FIGS. 1A-1C). In some embodiments, the geolocation tracking system 130 may store the resource processing request in a storage device (e.g., memory 104 or storage device 106 in FIGS. 1A-1C).

In some embodiments, a resource processing request may include a request sent from a device requesting the geolocation tracking system to process a transaction. In some embodiments, the resource processing request may be sent from any type of device (e.g., an end-point device, a user device, a merchant device, a financial terminal, an ATM, a kiosk, and/or the like).

In some embodiments, the resource processing request includes a request geolocation. In some embodiments, the request geolocation may refer to the geolocation of the device making the resource processing request (e.g., the end-point device, the user device, the merchant device, the financial terminal, the ATM, the kiosk, and/or the like). As used herein, "request geolocation" may refer to the physical, real-world location of the request (e.g., the geolocation of the device making the resource processing request). In some embodiments, the request geolocation may be approximated through the request's electronic address (e.g., IP (Internet Protocol) address, MAC (Media Access Control) address, and/or the like). In some embodiments, the request geolocation may refer to the geographic position of the device sending the request. In some embodiments, the request geolocation may refer to the mapping of an electronic address of the request to the real-world geographic location of the request. In some embodiments, the request geolocation may include a set of geographic coordinates (e.g., longitude and latitude) of the request. In some embodiments, the request geolocation may include a bearing and range from a known landmark. In some embodiments, the request geolocation may include a physical address (e.g., street address) of the request.

In some embodiments, the resource processing request may be associated with a user. In some embodiments, the resource processing request may be sent because the real user of the account is interacting with a resource distribution device. In some embodiments, the resource processing request may be sent because another user associated with the real user of the account is interacting with a resource distribution device. In some embodiments, the resource processing request may be sent because another user who is misappropriating the real user's account is interacting with the resource distribution device.

As shown in block 204, the process flow 200 may include receiving a device geolocation of a user device associated with the user. In some embodiments, the geolocation tracking system 130 may receive the device geolocation of a user device associated with the user from the network (e.g., network 110 of FIGS. 1A-1C). In some embodiments, the geolocation tracking system 130 may receive the device geolocation of a user device associated with the user through a communication device (e.g., a networking device coupled with the low-speed expansion port 114 of FIGS. 1A-1C). In some embodiments, the network (e.g., network 110 of FIGS. 1A-1C) may receive the device geolocation of a user associated with the user from an end-point device (e.g., end-point device(s) 140 of FIGS. 1A-1C). In some embodiments, the geolocation tracking system 130 may store the device geolocation in a storage device (e.g., memory 104 or storage device 106 in FIGS. 1A-1C).

In some embodiments, the device geolocation may refer to the geolocation of the device associated with the user. In some embodiments, the user device may include a mobile telephone, a personal computer, a smart watch, a key finder, a Global Positioning System (GPS) device, and/or the like. In some embodiments, the user device may be the real user's device. In some embodiments, the user device may be another person's device, where the other person is associated with the user (e.g., a spouse, a child, a parent, a friend, a trusted third-party, and/or the like).

As used herein, "device geolocation" may refer to the physical, real-world location of the device. In some embodiments, the device geolocation may be approximated through the device's electronic address (e.g., IP (Internet Protocol) address, MAC (Media Access Control) address, and/or the like). In some embodiments, the device geolocation may refer to the geographic position of the device. In some embodiments, the device geolocation may refer to the mapping of an electronic address of the device to the real-world geographic location of the device. In some embodiments, the device geolocation may include a set of geographic coordinates (e.g., longitude and latitude) of the device. In some embodiments, the device geolocation may include a bearing and range from a known landmark. In some embodiments, the device geolocation may include a physical address (e.g., street address) of the device.

As shown in block 206, the process flow 200 may include comparing the request geolocation and the device geolocation. In some embodiments, "comparing" may mean determining whether the request geolocation and the device geolocation match. In some embodiments, "comparing" may mean determining whether the request geolocation and the device geolocation approximately match.

In some embodiments, the geolocation tracking system 130 may compare the request geolocation and the device geolocation in a processor (e.g., processor 102 in FIGS. 1A-1C). In some embodiments, the geolocation tracking system 130 may store the request geolocation and the device geolocation in a storage device (e.g., memory 104 or storage device 106 in FIGS. 1A-1C).

As shown in block 208, the process flow 200 may include, based on the comparison of the request geolocation and the device geolocation, causing an execution of the resource processing request in an instance in which the request geolocation and the device geolocation match. In some embodiments, the geolocation tracking system 130 may cause an execution of the resource processing request in a processor (e.g., processor 102 in FIGS. 1A-1C). In some embodiments, the geolocation tracking system 130 may store the execution command in a storage device (e.g., memory 104 or storage device 106 in FIGS. 1A-1C).

In some embodiments, "match" may refer to when the request geolocation and the device geolocation are the exact same (e.g., the same geographic position, the same coordinates, the same physical address, and/or the like). In some embodiments, "match" may refer to when the request geolocation and the device geolocation are approximately the same (e.g., approximately the same geographic position, approximately the same coordinates, approximately the same physical address, within a predetermined range of one another, and/or the like).

In some embodiments, the execution of the resource processing request may refer to the geolocation tracking system causing the resource processing request to be completed (e.g., withdrawing resources, depositing resources, transferring resources, completing a purchase of goods or services, and/or the like). In some embodiments, the execution may be instantaneous and may happen as soon as the geolocation tracking system determines the request geolocation and the device geolocation match.

In some embodiments, the at least one processing device is further configured to, based on the comparison of the request geolocation and the device geolocation, cause a transmission of an escalation action in an instance in which the request geolocation and the device geolocation are different. The escalation action includes at least one of a rejection of the resource processing request or a request for at least one additional security measure. In some embodiments, the geolocation tracking system 130 may cause the transmission of the escalation action in a processor (e.g., processor 102 in FIGS. 1A-1C). In some embodiments, the geolocation tracking system 130 may cause the transmission of the escalation action to a network (e.g., network 110 in FIGS. 1A-1C) through a communication device (e.g., a networking device coupled with the low-speed expansion port 114). In some embodiments, the geolocation tracking system 130 may cause the transmission of the escalation action to an end-point device (e.g., end-point device(s) 140 in FIGS. 1A-1C).

As used herein, "different" may encompass a variety of definitions. For example, "different" may include that the request geolocation and the device geolocation are diverse, mismatched, unequal, distinct, not the same, do not match, and/or the like. As used herein, "different" may include that the request geolocation and the device geolocation are distinct.

As used herein, a "rejection" may encompass a variety of definitions. For example, "rejection" may refer to a declination, disregard, renunciation, and/or the like. As used herein, the escalation action may include a rejection (e.g., declination) of the resource processing request. By way of non-limiting example, if the resource processing request causes a transmission of an escalation action, the geolocation tracking system may reject the resource processing request of concern. In some embodiments, the rejection of the resource processing request may require interaction (e.g., execution) by an entity (e.g., a manager of the financial institution, the user, and/or the like). For instance, and by way of non-limiting example, the rejection of the resource processing request may require user interaction (e.g., user input including a rejection based on a prompt sent by the geolocation tracking system to the user device) after the transaction of concern is determined to be a misappropriation. In some embodiments, the rejection of the resource processing request may be automatic. For instance, and by way of non-limiting example, the rejection of the resource processing request may happen automatically as soon as the transaction of concern is determined to be a misappropriation.

As used herein, an "additional security measure" may encompass a variety of definitions. For example, "additional security measure" may refer to an enhanced security measure, heightened security measure, or supplemental security measure.

In some embodiments, the request for at least one additional security measure may cause a transmission of the request to the user device associated with the user to provide additional information relating to the resource processing request. In some embodiments, the geolocation tracking system 130 may cause the transmission of the request in a processor (e.g., processor 102 in FIGS. 1A-1C). In some embodiments, the geolocation tracking system may store the transmission of the request in a storage device (e.g., memory 104 or storage device 106 in FIGS. 1A-1C). In some embodiments, the geolocation tracking system 130 may transmit the request to a network (e.g., network 110 in FIGS. 1A-1C) with a communication device (e.g., a networking device coupled with the low-speed expansion port 114). In some embodiments, the geolocation tracking system 130 may transmit the request to an end-point device (e.g., end-point device(s) 140 in FIGS. 1A-1C). In some embodiments, the geolocation tracking system 130 may receive the additional information from the user from a network (e.g., network 110 in FIGS. 1A-1C). In some embodiments, the geolocation tracking system may receive the additional information from the network through a communication device (e.g., a networking device coupled with the low-speed expansion port 114). In some embodiments, the geolocation tracking system 130 may store the additional information from the user in a storage device (e.g., memory 104 or storage device 106 in FIGS. 1A-1C).

In some embodiments, the additional security measure may require user interaction with the user device or the resource distribution device. In some embodiments, the additional information may include requiring the user to enter additional authentication credentials (e.g., inputting a PIN (Personal Identification Number), analyzing user characteristics, answering security questions, and/or the like). In some embodiments, the geolocation tracking system may request one or more additional security measures, which may include any combination of additional security measures.

In some embodiments, the additional security measure may include the geolocation tracking system locking out the user account for a predetermined lockout time period. In some embodiments, the predetermined lockout time period may be any amount of time (e.g., ten minutes, 20 minutes, 30 minutes, one hour, 24 hours, a week, a month, and/or the like). In some embodiments, the predetermined lockout time period may be determined (e.g., pre-determined) by the entity associated with the user account (e.g., financial institution). In some embodiments, the predetermined lockout time period may be determined (e.g., pre-determined) by the user. In some embodiments, the predetermined lockout time period may be determined (e.g., pre-determined) by the entity associated with the resource distribution device (e.g., manager of merchant terminal, kiosk, ATM, financial terminal, and/or the like).

In some embodiments, the predetermined lockout time period may, from time to time, be reevaluated (e.g., reset to a different predetermined lockout time period). In some embodiments, the entity (e.g., financial institution, user, and/or the like) that initially set the predetermined lockout time period may reevaluate the predetermined lockout time period. In some embodiments, an entity different than the one that initially set the predetermined lockout time period may reevaluate the predetermined lockout time period.

In some embodiments, the additional security measure may include the geolocation tracking system locking out the user account until the user reauthenticates the user account. In some embodiments, the geolocation tracking system may request reauthentication of the user account from the user after the user account has been locked. In some embodiments, the reauthentication request may include requesting the user to enter the user's authentication information.

In some embodiments, the additional security measure may include causing a transmission of an alert interface component. The alert interface configures a graphical user interface of a third-party device. In some embodiments, the geolocation tracking system 130 may cause the transmission of the alert interface component in a processor (e.g., processor 102 in FIGS. 1A-1C). In some embodiments, the geolocation tracking system 130 may store the alert interface component in a storage device (e.g., memory 104 or storage device 106 in FIGS. 1A-1C). In some embodiments, the geolocation tracking system may transmit the alert interface component with a communication device (e.g., a networking device coupled with the low-speed expansion port 114 in FIGS. 1A-1C). In some embodiments, the geolocation tracking system 130 may transmit the alert interface component to an end-point device (e.g., end-point device(s) 140 in FIGS. 1A-1C).

In some embodiments, the third-party device may include a device associated with at least one of the user, a manager of the resource distribution device, a manager of the entity associated with the user account (e.g., a financial institution), or an agency (e.g., the local police, state investigation agencies, the federal investigation agencies, and/or the like). In some embodiments, the alert interface component may be transmitted to any combination of user devices, manager devices, or agency devices.

In some embodiments, the alert interface component may be transmitted from the geolocation tracking system to a user device associated with the real user of the user account. In this manner, the geolocation tracking system may indicate to the real user of the user account that a misappropriation attempt has occurred on the user account and may request the real user to complete a variety of tasks. In some embodiments, the variety of tasks may include at least one of requesting the user to input new authentication credentials for the user account (i.e., change the authentication credentials for the user account), indicate allowance or denial of the resource processing request (e.g., where the real user may wish the resource processing request to occur because the requesting party is a trusted third party), contact the manager of the resource distribution device, contact the manager of the financial institution associated with the user account, and/or the like. In some embodiments, the geolocation tracking system itself may automatically transmit an indication and/or the alert interface component to the manager of the resource distribution device or the manager of the financial institution associated with the user account indicating that the resource processing request has occurred, without the real user's interference and/or approval.

In some embodiments, the alert interface component may include a deterrence action. In some embodiments, the deterrence action may be transmitted simultaneously with the alert interface component. In some embodiments, the deterrence action may include forcing the resource distribution device to automatically reject the transaction of concern. In some embodiments, the deterrence action may include shutting down the resource distribution device for a specified amount of time (e.g., 30 minutes, one hour, two hours, 24 hours, and/or the like). In some embodiments, the deterrence action may include shutting down the resource distribution device until authorized personnel (e.g., a manager of the resource distribution device, a manager of the financial institution associated with the user account, and/or the like) reactivates the resource distribution device.

In some embodiments, in an instance in which the request geolocation and the device geolocation are matching, the at least one processing device is configured to cause a circumvention of at least one additional security measure associated with the resource processing request. In some embodiments, the geolocation tracking system 130 may cause the circumvention of at least one additional security measure in a processor (e.g., processor 102 in FIGS. 1A-1C).

As used herein, "circumvention" may encompass a variety of definitions. For example, "circumvention" may include avoidance, bypass, or forbearance of the escalation action. By way of non-limiting example, if the request geolocation and the device geolocation are matching, the geolocation tracking system may cause a circumvention of at least one additional security measure associated with the resource processing request.

In some embodiments, and by way of non-limiting example, if the request geolocation is outside of the predetermined geolocation range, but the request geolocation and the device geolocation match, then the escalation action may be circumvented by the geolocation tracking system.

In some embodiments, the geolocation tracking system 130 may cause the circumvention of at least one additional security measure associated with the resource processing request in a processor (e.g., processor 102 in FIGS. 1A-1C). In some embodiments, the geolocation tracking system 130 may store the circumvention of at least one additional security measure in a storage device (e.g., memory 104 or storage device 106 in FIGS. 1A-1C).

FIG. 3 illustrates a process flow for causing a transmission of an escalation action based on the comparison of the request geolocation and the predetermined geolocation range, in accordance with example embodiments of the disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

In some embodiments, a geolocation tracking system (e.g., similar to one or more of the systems described herein with respect to FIGS. 1A-1C) may perform one or more of the steps of process flow 300. For example, a geolocation tracking system (e.g., the system 130 described herein with respect to FIGS. 1A-1C) may perform the steps of process flow 300.

As shown in block 302, the process flow 300 may include receiving a predetermined geolocation range. In some embodiments, the geolocation tracking system 130 may receive the predetermined geolocation range from the network (e.g., network 110 of FIGS. 1A-1C). In some embodiments, the geolocation tracking system 130 may receive the predetermined geolocation range from the network through a communication device (e.g., a networking device coupled with the low-speed expansion port 114 of FIGS. 1A-1C). In some embodiments, the network (e.g., network 110 of FIGS. 1A-1C) may receive the predetermined geolocation range from an end-point device (e.g., end-point device(s) 140 of FIGS. 1A-1C). In some embodiments, the geolocation tracking system 130 may store the predetermined geolocation range in a storage device (e.g., memory 104 or storage device 106 in FIGS. 1A-1C).

As used herein, the "predetermined geolocation range" may include a center point component and a range component. As used herein, the center point component may refer to a set of coordinates, a physical address, a latitude and longitude, and/or the like that defines the center of the predetermined geolocation range. As used herein, the range component may refer to the length (e.g., distance) away from the center point component that the predetermined geolocation range extends. For instance, and by way of non-limiting example, the user may set the predetermined geolocation range as having the center point component on the user's house, with the range component extending a specified distance (e.g., two miles).

In some embodiments, the predetermined geolocation range may be set to any location. In some embodiments, the predetermined geolocation range may be set to the area surrounding the user's typical spending zone. For instance, and by way of non-limiting example, the user may set the predetermined geolocation range surrounding the user's home to include local gas stations, grocery stores, restaurants, and/or the like that the user frequently visits. In this way, the geolocation tracking system may be set to circumvent escalation actions for resource processing requests that take place within the predetermined geolocation range.

In some embodiments, the predetermined geolocation range may be determined (e.g., pre-determined) by an entity associated with the user's account (e.g., financial institution). In some embodiments, the predetermined geolocation range may be predetermined by the user. In some embodiments, the predetermined geolocation range may be set automatically by the geolocation tracking system. For instance, and by way of non-limiting example, if the user's spending habits reflect the user frequenting a particular area, the geolocation tracking system may determine that area as the predetermined geolocation range.

In some embodiments, the predetermined geolocation range may be any distance. In some embodiments, the predetermined geolocation range may be set to any unit of measure (e.g., inches, feet, miles, centimeters, meters, kilometers, and/or the like). In some embodiments, the predetermined geolocation range may be set to two miles. In some embodiments, the predetermined geolocation range may be one-half mile, one mile, three miles, four miles, five miles, six miles, seven miles, eight miles, nine miles, ten miles, 15 miles, or 20 miles.

In some embodiments, the predetermined geolocation range may, from time to time, be reevaluated (e.g., reset to a different predetermined geolocation range). In some embodiments, the entity (e.g., the financial institution, the user, and/or the like) that initially set the predetermined geolocation range may reevaluate the predetermined geolocation range. In some embodiments, an entity different than the one that initially set the predetermined geolocation range may reevaluate the predetermined geolocation range.

As shown in block 304, the process flow 300 may include comparing the request geolocation with the predetermined geolocation range. In some embodiments, the geolocation tracking system 130 may compare the request geolocation and the predetermined geolocation range in a processor (e.g., processor 102 in FIGS. 1A-1C). In some embodiments, the geolocation tracking system 130 may store the request geolocation and the predetermined geolocation range in a storage device (e.g., memory 104 or storage device 106 in FIGS. 1A-1C).

In some embodiments, "comparing" may mean determining whether the request geolocation and the predetermined geolocation range match. In some embodiments, the request geolocation may match the predetermined geolocation range when the request geolocation is within the predetermined geolocation range. In some embodiments, the request geolocation may not match the predetermined geolocation range when the request geolocation is outside of the predetermined geolocation range.

As shown in block 306, the process flow 300 may include, based on the comparison of the request geolocation being outside of the predetermined geolocation range, and the request geolocation and the device geolocation being different, causing a transmission of an escalation action. The escalation action includes at least one of a rejection of the resource processing request or a request for at least one additional security measure. In some embodiments, the geolocation tracking system 130 may cause the transmission of the escalation action in a processor (e.g., processor 102 in FIGS. 1A-1C). In some embodiments, the geolocation tracking system may store the transmission of the escalation action in a storage device (e.g., memory 104 or storage device 106 in FIGS. 1A-1C). In some embodiments, the geolocation tracking system 130 may transmit the escalation action to a network (e.g., network 110 in FIGS. 1A-1C) with a communication device (e.g., a networking device coupled with the low-speed expansion port 114). In some embodiments, the geolocation tracking system 130 may transmit the escalation action to an end-point device (e.g., end-point device(s) 140 in FIGS. 1A-1C). In some embodiments, the geolocation tracking system 130 may receive the additional security measure from a network (e.g., network 110 in FIGS. 1A-1C). In some embodiments, the geolocation tracking system may receive the additional security measure from the network through a communication device (e.g., a networking device coupled with the low-speed expansion port 114). In some embodiments, the geolocation tracking system 130 may receive the additional security measure from an end-point device (e.g., end-point device(s) 140 in FIGS. 1A-1C). In some embodiments, the geolocation tracking system 130 may store the additional security measure in a storage device (e.g., memory 104 or storage device 106 in FIGS. 1A-1C).

As used herein, "outside" may encompass a variety of definitions. For example, "outside" may include the request geolocation being situated beyond the boundaries, confines, limits, coordinates, bounds, edges, borders, circumference, perimeter, or threshold of the predetermined geolocation range. As used herein, "outside" may include that the request geolocation is beyond the boundaries of the predetermined geolocation range.

In some embodiments, the comparison of the request geolocation being outside of the predetermined geolocation range and the request geolocation and the device geolocation being different may happen instantaneously. For instance, and by way of non-limiting example, if the resource processing request is made outside of the predetermined geolocation range, and the device geolocation (e.g., user device) is different than the request geolocation (e.g., merchant geolocation), then the geolocation tracking system will cause a transmission of an escalation action. In some embodiments, the escalation action may include either a rejection of the resource processing request, a request for at least one additional security measure, or both.

FIG. 4 illustrates another example process flow for causing a transmission of an escalation action based on the comparison of the predetermined device geolocation range and the request geolocation, in accordance with example embodiments of the disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Unless otherwise noted, the operations discussed above in reference to FIG. 3 may also be used in the operations of FIG. 4. In some embodiments, a geolocation tracking system (e.g., similar to one or more of the systems described herein with respect to FIGS. 1A-1C) may perform one or more of the steps of process flow 400. For example, a geolocation tracking system (e.g., the system 130 described herein with respect to FIGS. 1A-1C) may perform the steps of process flow 400.

As shown in block 402, the process flow 400 may include receiving a predetermined device geolocation range. In some embodiments, the geolocation tracking system 130 may receive the predetermined device geolocation range from the network (e.g., network 110 of FIGS. 1A-1C). In some embodiments, the geolocation tracking system 130 may receive the predetermined device geolocation range from the network through a communication device (e.g., a networking device coupled with the low-speed expansion port 114 of FIGS. 1A-1C). In some embodiments, the network (e.g., network 110 of FIGS. 1A-1C) may receive the predetermined device geolocation range from an end-point device (e.g., end-point device(s) 140 of FIGS. 1A-1C). In some embodiments, the geolocation tracking system 130 may store the predetermined device geolocation range in a storage device (e.g., memory 104 or storage device 106 in FIGS. 1A-1C).

In some embodiments, the predetermined device geolocation range may be set to any range. As used herein, the "predetermined device geolocation range" may include a device center point component and a device range component. As used herein, the device center point component may refer to a set of coordinates, a physical address, a latitude and longitude, and/or the like that follows the geolocation of the device geolocation. As used herein, the device range component may refer to the length (e.g., distance) away from the device center point component that the predetermined device geolocation range extends. For instance, and by way of non-limiting example, the user may set the predetermined device geolocation range as extending a specified distance (e.g., ten feet) away from the device center point component.

In some embodiments, the predetermined device geolocation range may include the geolocation of any user device (e.g., mobile telephone, personal computer, smart watch, key finder, GPS device, and/or the like). In some embodiments, the predetermined device geolocation range may be determined (e.g., pre-determined) by an entity associated with the user's account (e.g., financial institution). In some embodiments, the predetermined device geolocation range may be predetermined by the user.

In some embodiments, the predetermined device geolocation range may be set to any distance. In some embodiments, the predetermined device geolocation range may be set to any unit of measure (e.g., inches, feet, miles, centimeters, meters, kilometers, and/or the like). In some embodiments, the predetermined device geolocation range may be set to ten feet. In some embodiments, the predetermined device geolocation range may be set to 20 feet, 30 feet, 40 feet, 50 feet, 60 feet, 70 feet, 80 feet, 90 feet, or 100 feet.

In some embodiments, the predetermined device geolocation range may, from time to time, be reevaluated (e.g., reset to a different predetermined device geolocation range). In some embodiments, the entity (e.g., the financial institution, the user, and/or the like) that initially set the predetermined device geolocation range may reevaluate the predetermined device geolocation range. In some embodiments, an entity different than the one that initially set the predetermined device geolocation range may reevaluate the predetermined device geolocation range (e.g., a financial institution may set a standard predetermined device geolocation range that can be adjusted by a user associated with the device).

As shown in block 404, the process flow 400 may include overlaying the predetermined device geolocation range on the device geolocation. In some embodiments, the geolocation tracking system 130 may overlay the predetermined device geolocation range on the device geolocation in a processor (e.g., processor 102 in FIGS. 1A-1C). In some embodiments, the geolocation tracking system 130 may store the overlayed predetermined device geolocation range on the device geolocation in a storage device (e.g., memory 104 or storage device 106 in FIGS. 1A-1C).

As used herein, "overlaying" may encompass a variety of definitions. For example, "overlaying" may include superimposing the predetermined device geolocation range on the device geolocation. For instance, and by way of non-limiting example, the predetermined device geolocation may be set to ten feet and be overlayed onto the device geolocation by the geolocation tracking system.

As shown in block 406, the process flow 400 may include comparing the request geolocation with the predetermined device geolocation range. In some embodiments, the geolocation tracking system 130 may compare the request geolocation and the predetermined device geolocation range in a processor (e.g., processor 102 in FIGS. 1A-1C). In some embodiments, the geolocation tracking system 130 may store the request geolocation and the predetermined device geolocation range in a storage device (e.g., memory 104 or storage device 106 in FIGS. 1A-1C).

In some embodiments, the predetermined device geolocation range may include the device center point component (e.g., the device geolocation) and the device range component. For instance, and by way of non-limiting example, the geolocation tracking system may compare the request geolocation with the predetermined device geolocation range set by the user and overlayed on the device geolocation.

As shown in block 408, the process flow 400 may include, based on the comparison of the request geolocation being outside of the predetermined device geolocation range, causing a transmission of an escalation action. The escalation action includes at least one of a rejection of the resource processing request or a request for at least one additional security measure. In some embodiments, the geolocation tracking system 130 may cause the transmission of the escalation action in a processor (e.g., processor 102 in FIGS. 1A-1C). In some embodiments, the geolocation tracking system may store the transmission of the escalation action in a storage device (e.g., memory 104 or storage device 106 in FIGS. 1A-1C). In some embodiments, the geolocation tracking system 130 may transmit the escalation action to a network (e.g., network 110 in FIGS. 1A-1C) with a communication device (e.g., a networking device coupled with the low-speed expansion port 114). In some embodiments, the geolocation tracking system 130 may receive the additional security measure from a network (e.g., network 110 in FIGS. 1A-1C). In some embodiments, the geolocation tracking system 130 may receive the additional security measure from the network through a communication device (e.g., a networking device coupled with the low-speed expansion port 114). In some embodiments, the geolocation tracking system 130 may store the additional security measure in a storage device (e.g., memory 104 or storage device 106 in FIGS. 1A-1C).

FIG. 5 illustrates a process flow for causing a circumvention of the escalation action based on the comparison of one or more request details with the one or more resource details, in accordance with example embodiments of the disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

In some embodiments, a geolocation tracking system (e.g., similar to one or more of the systems described herein with respect to FIGS. 1A-1C) may perform one or more of the steps of process flow 500. For example, a geolocation tracking system (e.g., the system 130 described herein with respect to FIGS. 1A-1C) may perform the steps of process flow 500.

As shown in block 502, the process flow 500 may include receiving a circumvent indicator. The circumvent indicator includes one or more resource details in which an escalation action is circumvented. The escalation action includes at least one of a rejection of the resource processing request or a request for at least one additional security measure. In some embodiments, the geolocation tracking system 130 may receive the circumvent indicator from the network (e.g., network 110 of FIGS. 1A-1C). In some embodiments, the geolocation tracking system 130 may receive the circumvent indicator from the network through a communication device (e.g., a networking device coupled with the low-speed expansion port 114 of FIGS. 1A-1C). In some embodiments, the network (e.g., network 110 of FIGS. 1A-1C) may receive the circumvent indicator from an end-point device (e.g., end-point device(s) 140 of FIGS. 1A-1C). In some embodiments, the geolocation tracking system 130 may store the circumvent indicator in a storage device (e.g., memory 104 or storage device 106 in FIGS. 1A-1C).

As used herein, a "circumvent indicator" may encompass a variety of definitions. In some embodiments, the circumvent indicator may be determined (e.g., pre-determined) by an entity. In some embodiments, the circumvent indicator may be determined by the user. In some embodiments, the circumvent indicator may include a price threshold, a particular type of request, a designated device, a designated resource distribution device, and/or the like. In some embodiments, the circumvent indicator may include each of the above-referenced definitions, any of the above-referenced definitions, or any combination of the above-referenced definitions. For instance, and by way of non-limiting example, the circumvent indicator may include a price threshold (e.g., $25). In another instance, and by way of non-limiting example, the circumvent indicator may include a price threshold (e.g., $25) and/or a particular type of request (e.g., transactions at a grocery store).

As used herein, "resource details" may refer to details relating to the resource processing request. For example, "resource details" may refer to a price threshold, type of request, requesting device identification information, resource distribution device identification information, and/or the like. In some embodiments, the geolocation tracking system may receive each of the above-referenced resource details, any of the above-referenced resource details, or any combination of the above-referenced resource details. For instance, and by way of non-limiting example, the geolocation tracking system may receive resource details referring to a particular resource processing request's price and/or type of request. In another instance, and by way of non-limiting example, the circumvent indicator may include a designated device of a third party. In such an instance, the resource processing request from the designated device would cause the geolocation tracking system to receive a circumvent indicator. In yet another instance, and by way of non-limiting example, the circumvent indicator may include a designated resource distribution device. In such an instance, the resource processing request sent from the designated resource distribution device would cause the geolocation tracking system to receive a circumvent indicator.

In some embodiments, the resource details may be determined (e.g., pre-determined) by an entity. In some embodiments, the resource details may be determined by the user. In some embodiments, the resource details may be determined by the entity associated with the user account.

As shown in block 504, the process flow 500 may include comparing one or more request details of the resource processing request with the one or more resource details of the circumvent indicator. In some embodiments, the geolocation tracking system 130 may compare the request details and the resource details in a processor (e.g., processor 102 in FIGS. 1A-1C). In some embodiments, the geolocation tracking system 130 may store the request details and the resource details in a storage device (e.g., memory 104 or storage device 106 in FIGS. 1A-1C).

As used herein, "request details" may refer to details relating to the details of the request relating to the resource processing request. For example, "request details" may refer to a price threshold, type of request, requesting device identification information, resource distribution device identification information, and/or the like. In some embodiments, the geolocation tracking system may receive each of the above-referenced request details, any of the above-referenced request details, or any combination of the above-referenced request details. For instance, and by way of non-limiting example, the geolocation tracking system may receive request details referring to a particular resource processing request's price and/or type of request.

As shown in block 506, the process flow 500 may include causing a circumvention of the escalation action in an instance in which at least one of the resource details of the circumvent indicator corresponds to at least one of the request details of the resource processing request. In some embodiments, the geolocation tracking system 130 may cause the circumvention of the escalation action in a processor (e.g., processor 102 in FIGS. 1A-1C).

In some embodiments, the at least one request details may correspond to the at least one resource details of the resource processing request. In some embodiments, the at least one request details corresponding to the at least one resource details may cause a circumvention of the escalation action. In some embodiments, the geolocation tracking system may cause the circumvention of the escalation by analyzing the request details of the resource processing request (e.g., price threshold, type of request, and/or the like).

As used herein, "correspond" may encompass a variety of definitions. For instance, "correspond" may include ascertaining that a parameter matches a predetermined criterion, including that a threshold has been met, passed, exceeded, and so on. For instance, and by way of non-limiting example, the geolocation tracking system may cause a circumvention of the escalation action if at least one of the resource details of the circumvent indicator (e.g., the price threshold) corresponds (e.g., is equal to or greater than) at least one of the request details of the resource processing request (e.g., the resource processing request's price). In this way, and by way of non-limiting example, the resource detail (e.g., price threshold) may be set to $25 and any resource processing request with a resource detail equal to or greater than the request detail may cause a circumvention of the escalation action.

In another instance, the geolocation tracking system may cause a circumvention of the escalation action if at least one of the resource details of the circumvent indicator (e.g., the type of request) corresponds (e.g., matches) at least one of the request details of the resource processing request (e.g., the resource processing request's type of request). In this way, and by way of non-limiting example, the type of request may be set to groceries, and any resource processing request with a type of request equal to groceries may cause a circumvention of the escalation action.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for determining probability of misappropriation of a resource based on geolocation tracking over an electronic network, the system comprising:
at least one non-transitory storage device; and
at least one processing device coupled to the at least one non-transitory storage device, wherein the at least one processing device is configured to:
receive a resource processing request, wherein the resource processing request comprises a request geolocation, and wherein the resource processing request is associated with a user;
receive a predetermined geolocation range, wherein the predetermined geolocation range comprises a plurality of locations the user visits and is determined by analyzing historical user transaction patterns, wherein the historical user transaction patterns are based on a spending zone of the user that includes merchants the user visits as determined automatically by analyzing a geolocation of the user;
receive a device geolocation of a user device associated with the user;
compare the request geolocation, the device geolocation, and the predetermined geolocation range; and
based on the request geolocation being different than the device geolocation and the request geolocation being different than the predetermined geolocation range, cause a transmission of a deterrence action to a resource distribution device, wherein the deterrence action is configured to cause the resource distribution device to reject the resource processing request and shut down the resource distribution device for a period of time.

2. The system of claim 1, wherein the at least one processing device is further configured to, based on the comparison of the request geolocation, the device geolocation, and the predetermined geolocation range cause a transmission of an escalation action in an instance in which the request geolocation and the device geolocation are different, wherein the escalation action comprises at least one of a rejection of the resource processing request or a request for at least one additional security measure.

3. The system of claim 2, wherein the request for at least one additional security measure comprises causing a transmission of the request to the user device associated with the user to provide additional information relating to the resource processing request.

4. The system of claim 1, wherein in an instance in which the request geolocation, the device geolocation, and the predetermined geolocation range are matching, the at least one processing device is configured to cause a circumvention of at least one additional security measure associated with the resource processing request.

5. The system of claim 1, wherein the at least one processing device is further configured to:
receive the predetermined geolocation range;
compare the request geolocation with the predetermined geolocation range; and
based on the comparison of the request geolocation being outside of the predetermined geolocation range, and the request geolocation and the device geolocation being different, cause a transmission of an escalation action, wherein the escalation action comprises a request for at least one additional security measure.

6. The system of claim 1, wherein the at least one processing device is further configured to:
receive the predetermined device geolocation range;
overlay the predetermined device geolocation range on the device geolocation;
compare the request geolocation with the predetermined device geolocation range; and
based on the comparison of the request geolocation being outside of the predetermined device geolocation range, cause a transmission of an escalation action, wherein the escalation action comprises at least one of a rejection of the resource processing request or a request for at least one additional security measure.

7. The system of claim 1, wherein the at least one processing device is further configured to:
receive a circumvent indicator, wherein the circumvent indicator comprises one or more resource details in which an escalation action is circumvented, wherein the escalation action comprises at least one of a rejection of the resource processing request or a request for at least one additional security measure;
compare one or more request details of the resource processing request with the one or more resource details of the circumvent indicator; and
cause a circumvention of the escalation action in an instance in which at least one of the resource details of the circumvent indicator corresponds to at least one of the request details of the resource processing request.

8. A computer program product for determining probability of misappropriation of a resource based on geolocation tracking over an electronic network, the computer program product comprising at least one non-transitory computer-readable medium having computer-readable program code portions embodied therein, the computer-readable program code portions comprising:
an executable portion configured to receive a resource processing request, wherein the resource processing request comprises a request geolocation, and wherein the resource processing request is associated with a user;
an executable portion configured to receive a predetermined geolocation range, wherein the predetermined geolocation range comprises a plurality of locations the user visits and is determined by analyzing historical user transaction patterns, wherein the historical user transaction patterns are based on a spending zone of the user the user's that includes merchants the user visits as determined automatically by analyzing a geolocation of the user;
an executable portion configured to receive a device geolocation of a user device associated with the user;
an executable portion configured to compare the request geolocation, the device geolocation, and the predetermined geolocation range; and
an executable portion configured to, based on the request geolocation being different than the device geolocation and the request geolocation being different than the predetermined geolocation range, cause a transmission of a deterrence action to a resource distribution device, wherein the deterrence action is configured to cause the resource distribution device to reject the resource processing request and shut down the resource distribution device for a period of time.

9. The computer program product of claim 8, wherein the computer program product further comprises an executable portion configured to, based on the comparison of the request geolocation, the device geolocation, and the predetermined geolocation range cause a transmission of an escalation action in an instance in which the request geolocation and the device geolocation are different, wherein the escalation action comprises at least one of a rejection of the resource processing request or a request for at least one additional security measure.

10. The computer program product of claim 9, wherein the request for at least one additional security measure comprises causing a transmission of the request to the user device associated with the user to provide additional information relating to the resource processing request.

11. The computer program product of claim 8, wherein the computer program product further comprises an executable portion configured to cause a circumvention of at least one additional security measure associated with the resource processing request in an instance in which the request geolocation, the device geolocation, and the predetermined geolocation range are matching.

12. The computer program product of claim 8, wherein the computer program product further comprises an executable portion configured to:

receive the predetermined geolocation range;

compare the request geolocation with the predetermined geolocation range; and based on the comparison of the request geolocation being outside of the predetermined geolocation range, and the request geolocation and the device geolocation being different, cause a transmission of an escalation action, wherein the escalation action comprises a request for at least one additional security measure.

13. The computer program product of claim 8, wherein the computer program product further comprises an executable portion configured to:

receive the predetermined device geolocation range;

overlay the predetermined device geolocation range on the device geolocation;

compare the request geolocation with the predetermined device geolocation range; and based on the comparison of the request geolocation being outside of the predetermined device geolocation range, cause a transmission of an escalation action, wherein the escalation action comprises at least one of a rejection of the resource processing request or a request for at least one additional security measure.

14. The computer program product of claim 8, wherein the computer program product further comprises an executable portion configured to:

receive a circumvent indicator, wherein the circumvent indicator comprises one or more resource details in which an escalation action is circumvented, wherein the escalation action comprises at least one of a rejection of the resource processing request or a request for at least one additional security measure;

compare one or more request details of the resource processing request with the one or more resource details of the circumvent indicator; and cause a circumvention of the escalation action in an instance in which at least one of the resource details of the circumvent indicator corresponds to at least one of the request details of the resource processing request.

15. A computer-implemented method for determining probability of misappropriation of a resource based on geolocation tracking over an electronic network, the computer-implemented method comprising:

receiving a resource processing request, wherein the resource processing request comprises a request geolocation, and wherein the resource processing request is associated with a user;

receiving a predetermined geolocation range, wherein the predetermined geolocation range comprises a plurality of locations the user visits and is determined by analyzing historical user transaction patterns, wherein the historical user transaction patterns are based on a spending zone of the user that includes merchants the user visits as determined automatically by analyzing a geolocation of the user;

receiving a device geolocation of a user device associated with the user;

comparing the request geolocation, the device geolocation, and the predetermined geolocation range; and based on the request geolocation being different than the device geolocation and the request geolocation being different than the predetermined geolocation range, causing a transmission of a deterrence action to a resource distribution device, wherein the deterrence action is configured to cause the resource distribution device to reject the resource processing request and shut down the resource distribution device for a period of time.

16. The computer-implemented method of claim 15, further comprising causing a transmission of an escalation action based on the comparison of the request geolocation, the device geolocation, and the predetermined geolocation range in an instance in which the request geolocation and the device geolocation are different, wherein the escalation action comprises at least one of a rejection of the resource processing request or a request for at least one additional security measure.

17. The computer-implemented method of claim 16, wherein the request for at least one additional security measure comprises causing a transmission of the request to the user device associated with the user to provide additional information relating to the resource processing request.

18. The computer-implemented method of claim 15, further comprising causing a circumvention of at least one additional security measure associated with the resource processing request in an instance in which the request geolocation and the device geolocation are matching.

19. The computer-implemented method of claim 15, further comprising:

receiving the predetermined geolocation range;

comparing the request geolocation with the predetermined geolocation range; and based on the comparison of the request geolocation being outside of the predetermined geolocation range, and the request geolocation and the device geolocation being different, causing a transmission of an escalation action, wherein the escalation action comprises a request for at least one additional security measure.

20. The computer-implemented method of claim 15, further comprising:

receiving the predetermined device geolocation range;

overlaying the predetermined device geolocation range on the device geolocation;

comparing the request geolocation with the predetermined device geolocation range; and based on the comparison of the request geolocation being outside of the predetermined device geolocation range, causing a transmission of an escalation action, wherein the escalation action comprises at least one of a rejection of the resource processing request or a request for at least one additional security measure.

* * * * *